US006696162B2

(12) United States Patent
Fife

(10) Patent No.: US 6,696,162 B2
(45) Date of Patent: Feb. 24, 2004

(54) PAINT AND COATING COMPOSITIONS CONTAINING TANTALUM AND/OR NIOBIUM POWDERS

(75) Inventor: James A. Fife, Myrtle Beach, SC (US)

(73) Assignee: Cabot Corporation, Boston, MA (US)

(*) Notice: Subject to any disclaimer, the term of this patent is extended or adjusted under 35 U.S.C. 154(b) by 0 days.

(21) Appl. No.: 10/194,455

(22) Filed: Jul. 12, 2002

(65) Prior Publication Data

US 2003/0024436 A1 Feb. 6, 2003

Related U.S. Application Data

(63) Continuation of application No. 09/272,406, filed on Mar. 19, 1999, now Pat. No. 6,444,008.
(60) Provisional application No. 60/078,584, filed on Mar. 19, 1998.

(51) Int. Cl.⁷ .............................................. B32B 15/04
(52) U.S. Cl. ..................... 428/457; 428/532; 428/688; 428/689
(58) Field of Search ........................ 428/457, 532, 428/688, 689

(56) References Cited

U.S. PATENT DOCUMENTS

| | | | |
|---|---|---|---|
| 3,635,761 A | 1/1972 | Haag et al. ................ 117/227 |
| 4,023,986 A | 5/1977 | Kessler .................. 148/6.14 R |
| 4,304,693 A | 12/1981 | Boberski et al. ........... 260/17 R |
| 4,361,598 A | 11/1982 | Yoldas ................... 106/287.16 |
| 4,496,398 A | 1/1985 | Whitehouse ................ 106/181 |
| 4,595,609 A | 6/1986 | Wellinghoff et al. ........ 427/377 |
| 4,826,923 A | 5/1989 | Hardiman .................. 525/306 |
| 4,830,879 A | 5/1989 | Dubrikdar .................. 427/162 |
| 4,863,516 A | 9/1989 | Mosser et al. ............ 106/14.12 |
| 4,940,490 A | 7/1990 | Fife et al. ................... 75/229 |
| 4,997,719 A | 3/1991 | Ohshima et al. .......... 428/473.5 |
| 5,082,811 A | 1/1992 | Bruno ...................... 501/134 |
| 5,211,741 A | 5/1993 | Fife .......................... 75/255 |
| 5,322,560 A | 6/1994 | DePue et al. .............. 106/404 |
| 5,434,200 A | 7/1995 | Kolker et al. ................ 524/35 |
| 5,470,906 A | 11/1995 | Craun et al. ................ 524/507 |
| 5,503,663 A | 4/1996 | Tsou ......................... 252/518 |
| 5,565,144 A | 10/1996 | Feist et al. ................. 252/518 |
| 5,569,412 A | 10/1996 | Feist et al. ................. 252/518 |
| 5,571,456 A | 11/1996 | Bergmann et al. ......... 252/518 |
| 5,580,367 A | 12/1996 | Fife .......................... 75/255 |
| 5,661,209 A | 8/1997 | Beers et al. ............... 524/476 |
| 5,707,683 A | 1/1998 | Currie et al. |
| 5,710,201 A | 1/1998 | Hayakawa et al. ......... 524/269 |
| 5,723,535 A | 3/1998 | Krismer et al. ............. 524/591 |
| 5,753,374 A | 5/1998 | Camilletti et al. .......... 428/446 |
| 5,776,235 A | 7/1998 | Camilletti et al. ........ 106/287.1 |
| 5,776,373 A | 7/1998 | Bergmann et al. ........ 106/443 |
| 5,945,035 A | 8/1999 | Vogt et al. ............... 252/520.1 |
| 5,980,983 A | 11/1999 | Gordon ..................... 427/226 |
| 5,997,894 A | 12/1999 | Blum et al. ................ 424/409 |
| 6,037,289 A | 3/2000 | Chopin et al. ................ 502/2 |

FOREIGN PATENT DOCUMENTS

| | | |
|---|---|---|
| FR | 2759360 | 8/1998 |
| JP | 57195735 | 12/1982 |
| JP | 96025851 | 3/1996 |
| JP | 08297201 | 11/1996 |
| JP | 409025436 | 1/1997 |
| WO | WO 98/19811 | 5/1998 |

*Primary Examiner*—Paul Marcantoni

(57) ABSTRACT

A coating formulation is described in which includes a solvent, a binder, and a metal additive comprising tantalum, niobium, alloys thereof, or mixtures thereof. Also described is a cellulose-based substrate which contains a cellulose-based reinforcing agent, a binder, and a metal additive comprising tantalum, niobium, alloys thereof, or mixtures thereof. Also described is a cement-based or plaster-based substrate containing a cement-based or plaster-based material and a metal additive comprising tantalum, niobium, alloys thereof, or mixtures thereof.

15 Claims, No Drawings

PAINT AND COATING COMPOSITIONS CONTAINING TANTALUM AND/OR NIOBIUM POWDERS

This application is a continuation of U.S. patent application Ser. No. 09/272,406, filed on Mar. 19, 1999, now U.S. Pat. No. 6,444,008, which based upon U.S. Provisional Application No. 60/078,584, filed Mar. 19, 1998, which benefit is claimed under 35 U.S.C. § 119(e), and is incorporated in its entirety herein by reference.

BACKGROUND OF THE INVENTION

The present invention relates to coating formulations, and more particularly relates to coating formulations used in areas exposed to radiation.

Electromagnetic radiation, such as Roentgen rays or X-rays, is emitted from many sources and can be an environmental concern when such levels of radiation are beyond acceptable limits. Conventional precautionary measures include the use of lead shielding. While lead-based coatings, such as paints, could assist in acting as a shield in a room where radiation such as X-rays is being emitted, lead-based coatings pose various environmental considerations such as possible lead-vapor emissions as well as the procedures associated with the removal and disposal of lead-based paints and coatings.

Accordingly, alternatives would be desirable to lead-based paints which do not have the same concerns associated with its use and removal.

SUMMARY OF THE INVENTION

A feature of the present invention is to provide an alternative to lead-based paints and coatings which are effective in shielding or blocking radiation.

Another feature of the present invention is to provide a coating or paint formulation which is easy to apply and yet provides acceptable if not excellent shielding capability towards radiation emissions.

Another feature of the present invention is to provide cellulose-based fiber, cellulose-based particle, cement-based or plaster-based substrates which are also effective in shielding or blocking radiation.

Additional features and advantages of the present invention will be set forth in part in the description which follows, and in part will be apparent from the description, or may be learned by practice of the present invention.

To achieve these and other advantages and in accordance with the purpose of the present invention, as embodied and broadly described herein, one aspect of the present invention is a coating formulation comprising a solvent, a binder, and a metal additive comprising tantalum, niobium, alloys thereof, or mixtures thereof.

In accordance with another aspect of the present invention there is provided a cellulose-based substrate comprising a cellulose-based reinforcing agent; a binder; and a metal additive comprising tantalum, niobium, alloys thereof, or a mixture thereof.

In accordance with another aspect of the present invention there is provided a cement-based or plaster-based substrate comprising at least one cement and/or plaster material; and a metal additive comprising tantalum, niobium, alloys thereof, or a mixture thereof.

It is to be understood that both the foregoing general description and the following detailed description are exemplary and explanatory only and are intended to provide further explanation of the present invention, as claimed.

DETAILED DESCRIPTION OF THE PRESENT INVENTION

One embodiment of the present invention relates to a coating composition which preferably is a paint formulation. The coating formulation contains a solvent, a binder, and a metal additive comprising tantalum, niobium, alloys thereof, or a mixture of both.

The metal additive can be any shape or size as long as its form is capable of being suspended in a coating formulation so that the metal additive is adequately dispersed in the coating formulation. Possible forms include, but are not limited to, fibers, particulates, powder, granular, finely-divided, and the like. In a preferred embodiment, the metal additive is a tantalum or niobium powder in which the individual powder particles can be of angular, nodular, flaked form (e.g., ball milled flakes and fractured flakes), or any combination thereof. Most preferably, the tantalum and/or niobium powder are flaked.

Also, the metal additive can be a hydrided or not hydrided form. With respect to the tantalum powder, it is preferred that the tantalum powder have an aspect ratio (D/T) of from about 20 to about 100. Also, it is preferred that the tantalum powder have a Scott Density of 30 g/inch$^3$ or less, more preferably 25 g/inch$^3$ or less, and even more preferably about 3 to about 20 g/inch$^3$. In addition, it is preferred that the tantalum powder have a BET of from about 0.2 m$^2$/g to about 2.0 m$^2$/g. Higher BETs are more preferred.

Similarly, it is preferred that the niobium powder have an aspect ratio of from about 20 to about 100. It is also preferred that the niobium powder have a Scott Density of about 15 g/inch$^3$ or less, more preferably 7.5 g/inch$^3$ or less, even more preferably 1 to about 7.5 g/inch$^3$. In addition, it is preferred that the niobium powder have a BET of from about 0.4 to about 4.0 m$^2$/g. Higher BETs are more preferred. Preferably, the particle size of the metal additive is from about 5 microns to about 100 microns, and more preferably from about 15 microns to about 50 microns in size.

Tantalum and/or niobium powder suitable for use as a metal additive in the present invention, preferably the unagglomerated forms, can be obtained from such commercial sources as Cabot Corporation's Cabot Performance Materials Division and HC Starck Inc. Examples of tantalum powder which can be used in the present invention include those tantalum powders set forth in U.S. Pat. Nos. 5,580,367; 5,448,447; 5,261,942; 5,234,491; 4,940,490; and 5,211,741, and all of these patents are incorporated in their entirety by reference herein.

In addition, the niobium powder described in PCT Application No. U.S./97/19949 can be used, and is incorporated in its entirety by reference herein.

The tantalum and/or niobium powder can be present in any amount in the coating formulation so long as the powder is capable of being suspended for a sufficient time so as to be applied onto the substrate to which it is being applied. Since a feature of the present invention is to have a coating (e.g. paint) formulation capable of shielding to some extent radiation emissions, it is preferred that the metal additive (e.g. tantalum and/or niobium powder) be flaked since such a shape provides the greatest amount of surface area for the amount of material present. Furthermore, flaked powder would more readily adhere to the substrate with the assistance of the binder present in the formulation. Also, flaked powder would more readily remain dispersed and suspended in a coating formulation and thus would provide a more uniform coverage on any surface to which it is applied. Preferably, the amount of metal additive present in the formulation of the invention would be from about 1% to about 40% by weight, and more preferably from about 5% to about 15% by weight based on the weight of the coating formulation.

The binder which is also known as the paint or coating vehicle, can be any binder conventionally used in coating and paint formulations. Generally, there are two classes of binders: latex and alkyd-based binders which ultimately result in what is known as latex paints and alkyd paints. The binders which can be used in the coating formulations of the present invention include, but are not limited to, synthetic resins and natural resins. Examples of synthetic resins include, but are not limited to, acrylic resins, vinyl resins, polyester resins, alkyd resins, butadiene resins, styrene resins, phthalic acid resins, urethane resins, epoxy resins, and the like. Preferred latex-based binders include, but are not limited to, poly(vinyl acetates), acrylics, vinyl acrylics, vinyl acetate copolymers, polymerized acrylates, such as polymerized butylacrylate, and the like. Other examples of binders or resins which can be used include fluorine resins, silicone resins, and fibrin type resins. The amount of the binder can be amounts conventionally used with other coating formulations. For instance, the amount of binder can be from about 25% to about 75% by weight of the coating formulation, and more preferably from about 45% by weight to about 60% by weight, based on the weight of the coating formulation.

With respect to the solvent, depending on the binder used, the solvent will either be aqueous or non-aqueous. In other words, if a latex-based binder is used, then the solvent will be aqueous in nature and if the binder is an alkyd-type binder, then the solvent will be non-aqueous. Examples of aqueous-based solvents include water, and water-based solutions such as water-alcohol mixtures and the like. Examples of non-aqueous solvents would be organic-based solvents, such as toluene; ketones, such as methylethyl ketone or methylisobutyl ketone; benzene; ethyl acetate; white spirit; alkanes; cycloalkanes; other aromatic compounds; isoparaffinic solvents; and any combinations thereof. As with any solvent, the solvent is volatile in nature so that when applied to a substrate, the solvent evaporates leaving behind the binder and any other additional ingredients, including the metal additive comprising tantalum and/or niobium, or alloys thereof. These types of solvents have also been known as coalescing solvents.

Besides the above components, other components traditionally or conventionally added in coating and paint formulations can also be included in the coating and paint formulations of the present invention. For instance, one or more coloring or tinting pigments and/or dyes can be present. Examples of such coloring or tinting agents are known to those skilled in the art. Examples include pigments of any color, including black (e.g. carbon black), white, green, brown, blue, tan, red, yellow, and shades thereof, and any mixtures thereof. Also, lubricants are preferably used with the coating or paint formulations of the present invention.

Other examples of additional, but optional, ingredients include wetting agents; suspension aids; thixotropic agents such as silica; extender or mineral pigments such as titanium dioxide, zinc oxide and titanium calcium, water repellant additives like polysiloxane compounds, fire retardant additives, and the like. Specific examples of pigments include yellow oxides, brown oxides, tan oxides, raw and burnt sienna or umber, chromium oxide, phthalocyanine green, phthalonitrile blue, ultramarine blue, cadmium pigments, and chromium pigments. Filler pigments such as clay, silica, talc, mica, woloastonite wood flour, barium sulfate, calcium carbonate, and the like can be added as well in conventional amounts traditionally used in coating and paint formulations.

The coating and paint formulations of the present invention can be produced in the same fashion as conventional coating and paint formulations by combining the ingredients in a mixer. In more detail, it is preferred that the pigment dispersion, which generally contains pigments and a dispersant, is formed in a dispenser mill, a sand mill, a pebble mill, a roller mill, a ball mill, or similar conventional grinding mills for milling mineral pigments into a dispersion medium. Once this dispersion medium is formed, the binder and other paint additives can be added including the metal additive (e.g., niobium and/or tantalum powder). Other dispersing means can be used such as agitator mixing, high-speed dispersers, and media milling.

The coating formulations of the present invention can be applied to a surface in any fashion such as by brush, air-spraying, or other means of applying coating or paint formulations which are conventionally used by those skilled in the art. In addition, it is preferred that more than one coat (e.g. two or more coats) be applied to a substrate in order to ensure more complete distribution coverage of the metal additive on the surface in order to provide effective shielding of the radiation. Preferably, the metal additive is uniformly distributed on the surface. It is most preferred that a sufficient amount of the metal additive be applied to the substrate in order to effectively block or shield electromagnetic radiation and/or other radiation sources (e.g., alpha and beta) so that substantially no electromagnetic radiation and/or other radiation sources escape through the substrate surface which has been coated with one or more coating layers of the present invention.

Typical substrates include, but are not limited to, wood, glass, plaster, brick, cinder blocks, stone, metal surfaces, fibre board, particle board, plaster board, drywall, and other materials used to construct structures and devices (e.g., crates, building, cartons, barrels, cans, etc.)

The coating formulations of the present invention can be applied as primers or undercoats or as finishing coats to give a flat, semi-gloss or gloss finishing coat depending upon the optional additives present, such as the pigments and extender pigments.

Once the coating or paint drys onto the substrate to which it has been applied, the dried coating or paint will generally contain at least one binder and the metal additive comprising niobium and/or tantalum powder or alloys thereof and optional additives such as pigments and the like, since it is expected that substantially all, if not all, of the solvent will have evaporated off.

A description of binders, solvents, and optional additives as well as methods of preparing general paint and coating formulations can be found, for instance, in U.S. Pat. Nos. 5,470,906; 5,710,201; and 5,661,209, all incorporated in their entirety by reference herein.

Besides the above embodiment, the present invention also relates to a cellulose-based fiber or particle substrate which comprises reinforcing agents like cellulose-based fibers, particles, or both; at least one binder; and a metal additive comprising tantalum, niobium, alloys thereof, or mixtures thereof. Examples of fiber and/or particle substrates include, but are not limited to, insulation board, medium density fiberboard, hardboard, particle board, laminated paperboard, flakeboard, chipcore board, or shavings board.

The metal additive present in the cellulose-based substrate can be the same as previously described. It is possible to add more metal additive (e.g., tantalum and/or niobium powder) in a cellulose-based substrate since there are no concerns about suspending the powder in any medium. Thus, just about any amount of niobium and/or tantalum powder or alloy thereof can be present in the cellulose-based substrate, e.g., from about 1% to about 50% or more, by weight of the substrate, as long as at least an effective amount is added.

With respect to the binder, preferably the binder is at least one resin which can be, for instance, a thermosetting resin or a cold setting resin (i.e., animal glue or other adhesive compounds which set in ambient temperatures) and the adhesive can be natural or synthetic resin adhesives. Examples of resins include, but are not limited to, diphenylmethane diisocyanate (MDI), methylene diethyl diisocyanate, isocyanurate, urea-formaldehyde, phenyl-formaldehyde, phenolic glue, animal hide glues, and the like. Generally, the binder is present in an amount sufficient to bind the fibers and particles together along with any other additives including the metal additive comprising tantalum and/or niobium or alloys thereof. For instance, the amount of binder that can be present is from about 2% to about 20% by weight, and more preferably from about 2% to about 10% by weight based on the weight of all of the components making up the fiber or particle substrate including the dried weight of the cellulose-based fibers and/or particles.

The cellulose-based fibers, particles, or both can be wood waste fiber and organic by-product materials. Preferably, the cellulose-based fibers, particles, or both are wood based fibers, strands, wafers, particles, cellulose fibers, mineral fibers, organic waste products, inorganic waste products and the like.

The cellulose-based fiber or particle substrate can be made as any other conventional fiber or particle substrate. For instance, the cellulose-based fibers or particles are preferably dried and then mixed with the binder. The mixing can occur in a blender or other suitable means of mixing materials together. The metal additive can be added at any stage; that is with the cellulose-based fibers or particles, or before, during, or after all other ingredients have been added.

Other additives that can be included (at conventional amounts) are pigments, fire retardant agents, cement-type ingredients, magnesium oxychloride and/or magnesium oxysulfate, latex, and other conventional ingredients used with fiber or particle substrates.

Once all the ingredients have been added, the mixture can then be formed into a mat. Once the mat is formed, it can be subjected to heat and/or pressure (e.g., hot pressed), thus forming the mats into panels and boards. For instance, a sufficient pressure can be applied to form the panels, such as about 400 psi to about 500 psi. With respect to temperatures for hot pressing, any sufficient temperature to form panels out of mats can be used, for instance, temperatures of about 375° F. for about 180 seconds to form panels having a $7/16$ inch thickness. Besides the above general procedure, U.S. Pat. No. 5,434,200 describes means of preparing cellulose-based fiber or particle substrates and is incorporated in its entirety by reference herein.

Another embodiment of the present invention involves cement-based and/or plaster-based substrates such as plaster boards and the like. The cement-based and/or plaster-based substrates comprise at least one cement-based and plaster-based material as well as a metal additive comprising tantalum, niobium, alloys thereof, or mixtures of both. Optional additives like binders, pigments, fire retardants, and the like can be added in conventional amounts. Like the cellulose-based substrate described above, the metal additive is incorporated into the cement-based and/or plaster-based material either in the dry state or in the wet state and, thus be incorporated into the cement-based and/or plaster-based substrate.

In making the substrates of the present invention, whether cellulose-based or cement and/or plaster-based, the metal additive powder can be applied once the mat and/or wet board is formed but prior to the final drying. For instance, the metal additive can be sprinkled or applied by other means on top of the wet substrate, which will ensure that the metal additive (e.g., powder) is uniformly applied and is present in sufficient amounts on a side of the substrate.

Other embodiments of the present invention will be apparent to those skilled in the art from consideration of the specification and practice of the present invention disclosed herein. It is intended that the specification and examples be considered as exemplary only, with a true scope and spirit of the present invention being indicated by the following claims.

What is claimed is:

1. A cellulose-containing substrate comprising a) a cellulose-containing reinforcing agent; b) a binder; and c) a metal additive comprising tantalum, niobium, alloys thereof, or mixtures thereof.

2. The cellulose-containing substrate of claim 1, wherein said metal additive is flaked.

3. A cement-containing or plaster-containing substrate comprising a cement-containing or plaster-containing material and a metal additive comprising tantalum, niobium, alloys thereof, or mixtures thereof.

4. The cellulose-containing substrate of claim 1, wherein said metal additive is tantalum powder and optionally hydrided.

5. The cellulose-containing substrate of claim 1, wherein said metal additive is niobium powder and optionally hydrided.

6. The cellulose-containing substrate of claim 1, wherein said tantalum powder is flaked tantalum and optionally hydrided.

7. The cellulose-containing substrate of claim 1, wherein said metal additive is angular, nodular, flaked, or combinations thereof.

8. The cellulose-containing substrate of clam 4, wherein said tantalum powder has at least one of the following:

an aspect ratio of from about 20 to about 100;

a Scott Density of from about 3 $g/inch^3$ to about 30 $g/inch^3$; or a BET of from about 0.2 $m^2/g$ to about 2.0 $m^2/g$.

9. The cellulose-containing substrate of claim 1, wherein said binder comprises at least one polymeric binder.

10. The cellulose-containing substrate of claim 1, wherein said binder is a latex-containing binder.

11. The cellulose-containing substrate of claim 1, further comprising a coloring pigment, a fire retardant aid, a suspension aid, an extender pigment, a thickening agent, or combinations thereof.

12. The cellulose-containing substrate of claim 5, wherein said niobium powder is flaked, and optionally hydrided.

13. The cellulose-containing substrate of claim 5, wherein said niobium powder has at least one of the following:

an aspect ratio of from about 20 to about 100;

a Scott Density of from about 1 to about 15 $g/inch^3$; or a BET of from about 0.4 to about 4.0 $m^2/g$.

14. The cellulose-containing substrate of claim 1, wherein said binder comprises an alkyd-containing binder.

15. The cellulose-containing substrate of claim 1, wherein said metal additive is present in an amount of from about 1% to about 40% by weight of the substrate.

* * * * *